US012606687B2

(12) United States Patent
Hirabayashi et al.

(10) Patent No.: US 12,606,687 B2
(45) Date of Patent: Apr. 21, 2026

(54) SILICONE RUBBER SPONGE COMPOSITION AND PRODUCING METHOD THEREOF

(71) Applicant: SHIN-ETSU CHEMICAL CO., LTD., Tokyo (JP)

(72) Inventors: Satao Hirabayashi, Takasaki (JP); Tomoya Minamikawa, Takasaki (JP); Mikio Iino, Takasaki (JP); Nobumasa Tomizawa, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 611 days.

(21) Appl. No.: 18/008,586

(22) PCT Filed: May 7, 2021

(86) PCT No.: PCT/JP2021/017576
§ 371 (c)(1),
(2) Date: Dec. 6, 2022

(87) PCT Pub. No.: WO2021/256115
PCT Pub. Date: Dec. 23, 2021

(65) Prior Publication Data
US 2023/0235147 A1 Jul. 27, 2023

(30) Foreign Application Priority Data
Jun. 15, 2020 (JP) .................................. 2020-102970

(51) Int. Cl.
*C08J 9/32* (2006.01)
*C08K 3/36* (2006.01)
*C08K 7/26* (2006.01)

(52) U.S. Cl.
CPC .................. *C08J 9/32* (2013.01); *C08K 3/36* (2013.01); *C08J 2203/22* (2013.01); *C08J 2383/04* (2013.01); *C08K 7/26* (2013.01)

(58) Field of Classification Search
CPC . C08J 9/32; C08J 9/0061; C08J 9/0066; C08J 2203/22; C08J 2483/04; C08J 2383/04; C08K 3/36; C08K 7/22; C08K 3/013; C08K 7/26; C08L 83/04
See application file for complete search history.

(56) References Cited

U.S. PATENT DOCUMENTS

| | | | |
|---|---|---|---|
| 5,676,786 A | 10/1997 | Mizuno et al. | |
| 5,750,581 A | 5/1998 | Brennenstuhl et al. | |
| 2004/0259965 A1* | 12/2004 | Higuchi .................. | C08L 83/04 521/82 |
| 2011/0021649 A1 | 1/2011 | Sakuma et al. | |
| 2012/0161066 A1 | 6/2012 | Hirabayashi | |

FOREIGN PATENT DOCUMENTS

| | | | |
|---|---|---|---|
| CN | 1923900 A | | 3/2007 |
| CN | 101663358 A | | 3/2010 |
| CN | 101983989 A | | 3/2011 |
| CN | 104968747 A | | 10/2015 |
| CN | 107868471 | * | 4/2018 |
| CN | 107868471 A | | 4/2018 |
| JP | H08-258224 A | | 10/1996 |
| JP | H09-137063 A | | 5/1997 |
| JP | H10-245445 A | | 9/1998 |
| JP | 2001-293742 A | | 10/2001 |
| JP | 2002-128937 A | | 5/2002 |
| JP | 2004026875 A | * | 1/2004 |
| JP | 2012-153774 A | | 8/2012 |
| JP | 2014112172 | * | 6/2014 |
| JP | 2018-053020 A | | 4/2018 |
| JP | 2018-065889 A | | 4/2018 |
| JP | 2019-196420 A | | 11/2019 |
| KR | 2012-0071336 A | | 7/2012 |

OTHER PUBLICATIONS

Data Sheet for Sunsphere silica from AGC Si-Tech Co., Ltd. (2025) (Year: 2025).*
Jul. 27, 2021 International Search Report issued in International Patent Application No. PCT/JP2021/017576.
Dec. 13, 2022 International Preliminary Report on Patentability issued in International Patent Application No. PCT/JP2021/017576.
Zhou, Wenying, QI, Shuhua, TU, Chunchao, Zhao, Hongzhen, WU, Bo, "Thermally Conductive Silicone Rubber Composites," Journal of Aeronautical Materials, vol. 27, No. 1, Feb. 2007, pp. 33-36.
Jan. 17, 2024 Search Report issued in Chinese Patent Application No. 202180042187.X.
Jan. 22, 2026 Office Action issued in Korean Patent Application No. 10-2022-7042685.

* cited by examiner

*Primary Examiner* — K. Boyle
(74) *Attorney, Agent, or Firm* — Oliff PLC

(57) ABSTRACT

A silicone rubber sponge composition, including: (A) 100 parts by mass of an addition-crosslinkable silicone rubber composition containing a reinforcing silica and being liquid at 25° C.; (B) 1.0 to 20 parts by mass of expanded resin fine particles having a specific gravity of 0.01 to 0.3, having an average particle diameter of 10 to 200 μm, and having an organic resin shell; and (C) 0.1 to 10 parts by mass of spherical particles having average particle diameter being 0.001 to 0.5 times larger than average particle diameter of the component (B) expanded resin fine particles, and having an average circularity of 0.8 to 1. This improves flowability of silicone rubber sponge composition containing the expanded resin fine particles, reduces contractive deformation due to pressure of the expanded resin fine particles during casting or injection-molding. Thus, provided are a silicone rubber sponge composition that can reduce density of a sponge rubber.

8 Claims, 1 Drawing Sheet

[FIG. 1]
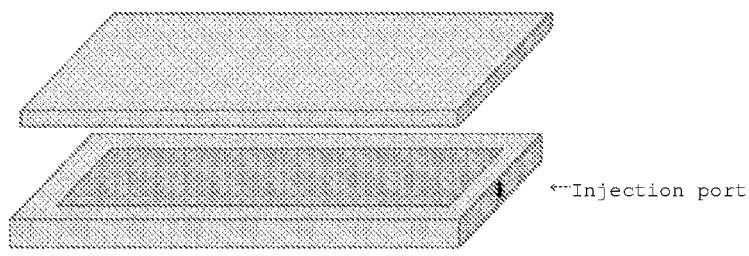
←Injection port
[FIG. 2]
Hardness variation measurement points
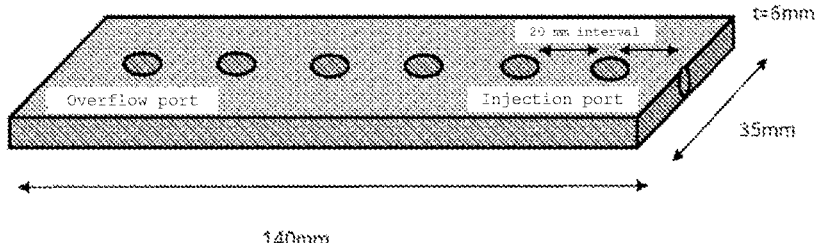
t=6mm
20 mm interval
Overflow port          Injection port
35mm
140mm
[FIG. 3]
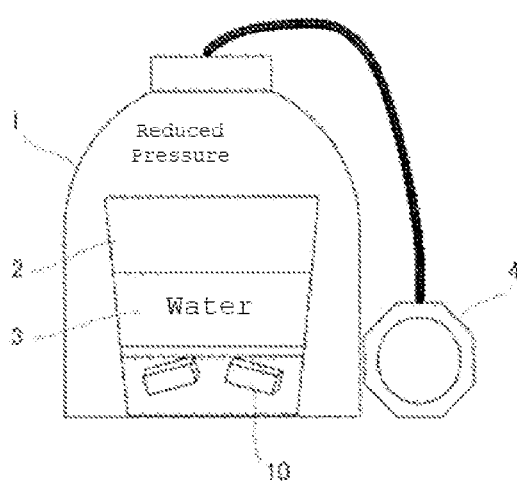
Reduced Pressure
Water

SILICONE RUBBER SPONGE COMPOSITION AND PRODUCING METHOD THEREOF

TECHNICAL FIELD

The present invention relates to a silicone rubber sponge composition containing expanded resin fine particles, and a producing method thereof.

BACKGROUND ART

A silicone rubber sponge is a sponge having excellent physical characteristics, such as heat resistance, cold resistance, electrical insulation, flame retardancy, and compression permanent set, peculiar to silicone rubber. The silicone rubber sponges, which have such characteristics, are used in office automation equipment, automobiles, construction materials, etc. in order to progress reduction in thermal conductivity and weight reduction.

The silicone rubber sponge is produced by various methods, including their molding and foaming form, depending on its usage. One of them is a disclosed method in which expanded resin fine particles having a specific gravity of 0.01 or more are blended with uncured liquid silicone rubber sponge composition, and heat-cured to use for the sponge (Patent Document 1). A specific gravity of the silicone rubber sponge can be reduced by blending a large amount of the expanded resin fine particles. However, since the resin component of the expanded resin fine particles is collapsed by a mold-injecting pressure when casted or injection-molded, the expanded resin fine particles have a problem of increase in the specific gravity after curing compared with the density before the injection.

A material containing a hollow powder of an inorganic material, such as glass and ceramic, in a rubber is also known (Patent Document 2). Since a shell of the inorganic material is harder than the expanded resin fine particles, the particles are hardly collapsed by the mold-injecting pressure, and the difference in the specific gravity before and after the molding is small. However, the specific gravity of the powder itself is large, and thereby does not sufficiently contribute to the weight reduction. In addition, since being the inorganic material, such a material yields insufficient reduction in thermal conductivity and a cushioning property.

CITATION LIST

Patent Literature

Patent Document 1: JP H9-137063 A
Patent Document 2: JP 2004-026875 A

SUMMARY OF INVENTION

Technical Problem

The present invention has been made in view of the above-described circumstances. An object of the present invention is to provide a silicone rubber sponge composition that has a reduced density of a sponge rubber, which is a molded material, and that can reduce density variation and hardness variation by improving flowability of the silicone rubber sponge composition containing expanded resin fine particles and by reducing contractive deformation due to pressure of the expanded resin fine particles during casting or injection-molding. In addition, an object of the present invention is to provide a method for producing a silicone rubber sponge.

Solution to Problem

To solve the above problem, the present invention provides a silicone rubber sponge composition, comprising: (A) 100 parts by mass of an addition-crosslinkable silicone rubber composition containing a reinforcing silica and being liquid at 25° C.; (B) 1.0 to 20 parts by mass of expanded resin fine particles having a specific gravity of 0.01 to 0.3, having an average particle diameter of 10 to 200 μm, and having an organic resin shell; and (C) 0.1 to 10 parts by mass of spherical particles having an average particle diameter being 0.001 to 0.5 times larger than the average particle diameter of the expanded resin fine particles of the component (B), and having an average circularity of 0.8 to 1.

Such a silicone rubber sponge composition improves flowability of the silicone rubber sponge composition containing the expanded resin fine particles, and reduces contractive deformation due to pressure of the expanded resin fine particles during casting or injection-molding. Thus, a density of a sponge rubber, which is a molded material, can be reduced, and density variation and hardness variation can be reduced.

The present invention can also provide the silicone rubber sponge composition, further comprising (D) 0.5 to 20 parts by mass of one or two or more one-cell foaming agents selected from: a monomer selected from a polyhydric alcohol having at least two alcoholic hydroxy groups in one molecule and having 2 to 10 carbon atoms, and a partial ether compound, partial ester compound, partially silylated compound, and partially halogenated compound of the polyhydric alcohol; and a polymer of one or two or more of the monomer.

Such a silicone rubber sponge composition can have a state where adjacent sponge cells in the rubber cured material have a communicated hole, and can have a state where the air can enter the sponge inside through the outer skin of the cured sponge.

The present invention can provide the silicone rubber sponge composition, wherein the spherical particles of the component (C) are a fused silica, a silicone resin, a glass, a hollow glass, alumina, or a mixture thereof.

Such a silicone rubber sponge composition can improve the flowability.

The present invention can provide the silicone rubber sponge composition, wherein the organic resin shell of the expanded resin fine particles of the component (B) is: a polymer of a monomer selected from the group consisting of vinylidene chloride, acrylonitrile, methacrylonitrile, an acrylate ester, and a methacrylate ester; or a copolymer of two or more of the monomer.

Such a silicone rubber sponge composition can further improve the effect of the present invention.

The present invention can provide a method for producing a silicone rubber sponge, the method comprising a step of forming a sponge by injecting the above silicone rubber sponge composition into a mold at a pressure of 0.01 MPa to 5 MPa.

Such a method for producing a silicone rubber sponge allows the composition to be filled into the mold with thixotropy of the composition, which eliminates a risk of collapse or break of the expanded resin fine particles of the component (B) due to a high filling pressure to fail to form a sponge.

Advantageous Effects of Invention

The inventive silicone rubber sponge composition and the inventive method for producing a silicone rubber sponge provide a sponge having a reduced density of a sponge, which is a molded material, and reduced density variation and hardness variation by the composition having excellent flowability and by inhibiting collapse of the molded material of the blended expanded resin fine particles due to the molding pressure.

BRIEF DESCRIPTION OF DRAWINGS

FIG. 1 is a schematic view of a mold for cast-molding the inventive composition.

FIG. 2 is a schematic view of a rubber sheet for measuring a hardness after cast-molding.

FIG. 3 is a schematic view of a device for measuring a one-cell foaming rate after curing the inventive sponge rubber.

DESCRIPTION OF EMBODIMENTS

As described above, required is a development of a silicone rubber sponge composition and a method for producing a silicone rubber sponge that have a reduced density of a sponge rubber, which is a molded material, and that can reduce density variation and hardness variation by improving flowability of the silicone rubber sponge composition containing expanded resin fine particles, and by reducing contractive deformation due to pressure of the expanded resin fine particles during casting or injection-molding.

The present inventors have earnestly studied to achieve the above object and consequently found a method for obtaining a silicone rubber sponge having a reduced weight of the sponge, which is a molded material, and having reduced density variation and hardness variation. In the method, into a thermally curable organopolysiloxane composition blended with expanded resin fine particles, spherical particles having a size 0.001 to 0.5 times larger than a particle diameter of the expanded resin fine particles are added to remarkably improve the flowability of the composition.

Specifically, the present invention is a silicone rubber sponge composition, comprising: (A) 100 parts by mass of an addition-crosslinkable silicone rubber composition containing a reinforcing silica and being liquid at 25° C.; (B) 1.0 to 20 parts by mass of expanded resin fine particles having a specific gravity of 0.01 to 0.3, having an average particle diameter of 10 to 200 µm, and having an organic resin shell; and (C) 0.1 to 10 parts by mass of spherical particles having an average particle diameter being 0.001 to 0.5 times larger than the average particle diameter of the expanded resin fine particles of the component (B), and having an average circularity of 0.8 to 1.

Hereinafter, the present invention will be described in detail, but the present invention is not limited thereto.

—Composition (A)—

The composition (A) is an addition-crosslinkable silicone rubber composition containing a reinforcing silica and being a liquid at 25° C. The silicone rubber composition is a main component of the inventive silicone rubber sponge composition. Specifically, the addition-crosslinkable silicone rubber composition of the component (A) is composed of components (A1), (A2), (A3), and (A4), described below.

—(A1) Liquid Organopolysiloxane—

A liquid organopolysiloxane of the component (A1) is an organopolysiloxane represented by the following average composition formula (I) and having at least two alkenyl groups in one molecule, $$R^1_a SiO_{(4-a)/2} \tag{I}$$

wherein $R^1$ represents a same or different monovalent hydrocarbon group, and "a" represents a positive number of 1.95 to 2.04.

In the formula (I), $R^1$ represents a same or different monovalent hydrocarbon group, and preferable examples thereof include a monovalent hydrocarbon group preferably having 1 to 12 carbon atoms and more preferably having 1 to 8 carbon atoms.

Specific examples of the monovalent hydrocarbon group include: alkyl groups, such as a methyl group, an ethyl group, a propyl group, a butyl group, and a hexyl group; cycloalkyl groups, such as a cyclohexyl group; alkenyl groups, such as a vinyl group, an allyl group, a butenyl group, and a hexenyl group; aryl groups, such as a phenyl group and a tolyl group; and aralkyl groups, such as a benzyl group and a phenylethyl group. A part or all of hydrogen atoms bonded to a carbon atom in these groups may be substituted with a halogen atom. Examples of the halogen-substituted group include a chloromethyl group and a trifluoropropyl group. Among these, a methyl group, a vinyl group, a phenyl group, and a trifluoropropyl group are preferable. In particular, 80 mol % or more, further 95 mol % or more, of a methyl group is preferable.

In the formula (I), "a" represents a positive number of 1.95 to 2.04, and preferably a positive number of 1.98 to 2.02.

Although the above organopolysiloxane is substantially linear chain, the organopolysiloxane may have a branch as long as the cured silicone rubber sponge has rubber elasticity. The terminals of the molecular chain of this organopolysiloxane may be blocked with a trimethylsilyl group, a dimethylvinyl group, a dimethylhydroxysilyl group, and a trivinylsilyl group. In the present invention, this organopolysiloxane has to have at least two alkenyl groups in the molecule. Specifically, 0.001 to 5 mol %, particularly 0.05 to 0.5 mol %, of an alkenyl group, particularly a vinyl group, among $R^1$ is preferable.

The organopolysiloxane of the component (A1) can be obtained by hydrolytic condensation of normally selected one or two or more organohalosilanes, or by ring-opening polymerization of a cyclic polysiloxane (trimer or tetramer of siloxane, etc.) using an alkaline or acidic catalyst. This is basically a linear-chain diorganopolysiloxane, but a part thereof may be a branch. The organopolysiloxane may be a mixture of two or more organopolysiloxanes having different molecular structures. This organopolysiloxane has a polymerization degree of 100 to 600, preferably 150 to 500, and further preferably 200 to 400.

The polymerization degree in the present invention can be determined as a number-average polymerization degree with polystyrene conversion measured by gel permeation chromatography (GPC) analysis under the following measurement conditions with toluene as a developing solvent.

[Measurement Conditions]

Developing solvent: toluene

Flow rate: 0.350 mL/min

Detector: diffraction refractive index detector (RI)

Column: TSKgel Super MultiporeHZ-H

5

6

(all the above are manufactured by Tosoh Corporation)
Column temperature: 40° C.

Sample injection amount: 10 μL (a toluene solution at a concentration of 0.1 mass %)

The organopolysiloxane of the component (A1) is liquid at 25° C. In particular, the viscosity measured with B-type rotary viscosimeter in accordance with JIS K 7117-1:1999 is preferably 0.05 to 30 Pas, and more preferably 0.3 to 10 Pas.

—(A2) Organohydrogenpolysiloxane—

An organohydrogenpolysiloxane of the component (A2) is represented by the following average composition formula (II) and having at least two (typically 2 to 300), preferably 3 or more, more preferably approximately 3 to 150 silicone atom-bonded hydrogen atoms (that is, SiH groups) in one molecule.

$$R^2_b H_c SiO_{(4-b-c)/2} \tag{II}$$

In the formula (II), $R^2$ represents a substituted or unsubstituted monovalent hydrocarbon group having 1 to 10 carbon atoms. Examples of this $R^2$ include the same group as $R^1$ in the formula (I). $R^2$ preferably has no aliphatic unsaturated group.

In the formula (II), "b" represents a positive number of 0.7 to 2.1, "c" represents a positive number of 0.001 to 1.0, and "b+c" represents a positive number satisfying 0.8 to 3.0. Preferably, "b" represents a positive number of 1.0 to 2.0, "c" represents a positive number of 0.01 to 1.0, and "b+c" represents a positive number of 1.5 to 2.5.

In the organohydrogenpolysiloxane represented by the formula (II), the at least two, preferably three or more, SiH groups contained in one molecule may be positioned at any of the terminal of the molecular chain and inside the molecular chain, or may be positioned at both thereof. The molecular structure of this organohydrogenpolysiloxane may be any of linear-chain, cyclic, branched, and three-dimensional mesh structures. A number of silicone atoms in one molecule (or a polymerization degree) is typically approximately 2 to 300, preferably approximately 4 to 150. The organohydrogenpolysiloxane is desirably liquid at a room temperature (25° C.)

Specific examples of the organohydrogenpolysiloxane represented by the formula (II) include 1,1,3,3-tetramethyl-disiloxane, methylhydrogencyclopolysiloxane, methylhydrogensiloxane-dimethylsiloxane cyclic copolymer, methylhydrogenpolysiloxane blocked at both terminals with trimethylsiloxy groups, dimethylsiloxane-methylhydrogensiloxane copolymer blocked at both terminals with trimethylsiloxy groups, dimethylpolysiloxane blocked at both terminals with dimethylhydrogensiloxy groups, dimethylsiloxane-methylhydrogensiloxane copolymer blocked at both terminals with dimethylhydrogensiloxy groups, methylhydrogensiloxane-diphenylsiloxane copolymer blocked at both terminals with trimethylsiloxy groups, methylhydrogensiloxane-diphenylsiloxane-dimethylsiloxane copolymer blocked at both terminals with trimethylsiloxy groups, methylhydrogensiloxane-dimethylsiloxane-diphenylsiloxane copolymer blocked at both terminals with dimethylhydrogensiloxy groups, a copolymer composed of a $(CH_3)_2HSiO_{1/2}$ unit, a $(CH_3)_3SiO_{1/2}$ unit, and a $SiO_{4/2}$ unit, a copolymer composed of a $(CH_3)_2HSiO_{1/2}$ unit and a $SiO_{4/2}$ unit, and a copolymer composed of a $(CH_3)_2HSiO_{1/2}$ unit, a $SiO_{4/2}$ unit, and a $(C_6H_5)_3SiO_{1/2}$ unit.

A blend amount of this organohydrogenpolysiloxane is preferably 0.1 to 50 parts by mass, particularly preferably 0.3 to 20 parts by mass, relative to 100 parts by mass of the organopolysiloxane of the component (A1). The organohydrogenpolysiloxane of the component (A2) may be blended at an amount of the hydrogen atoms bonded on a silicone atom (SiH groups) in the component (A2) of approximately 0.5 to 5 mol, particularly approximately 0.8 to 2.5 mol, relative to 1 mol of the alkenyl groups bonded to a silicone atom in the component (A1).

—(A3) Reinforcing Silica—

A reinforcing silica of the component (A3), which is a filler essential for improving processability, mechanical strength, etc. of the silicone rubber sponge, is an essential component of the component (A). This reinforcing silica has a specific surface area of preferably 50 m²/g or more, and more preferably 100 to 400 m²/g. Examples of this reinforcing silica include a fumed silica (dry silica) and a precipitated silica (wet silica). Among these, a fumed silica (dry silica) is preferable. A surface of these silicas may be subjected to a hydrophobization treatment with an organopolysiloxane, an organopolysilazane, chlorosilane, an alkoxysilane, etc. These silicas may be used alone, or may be used in combination of two or more thereof. A blend amount of this reinforcing silica is 0.5 to 30 parts by mass, preferably 1 to 20 parts by mass, and particularly preferably 1.5 to 10 parts by mass, relative to 100 parts by mass of the organopolysiloxane of the component (A1). When the blend amount of this reinforcing silica is 0.5 parts by mass or more, a sufficient reinforcing effect can be obtained. When the blend amount is 30 parts by mass or less, processability of a non-crosslinked silicone rubber sponge is not deteriorated, the one-cell foaming rate of the obtained silicone rubber sponge is not decreased, a viscosity of the silicone rubber sponge composition before crosslinking does not become too high, and the sponge density does not become too high.

—(A4) Addition Reaction Catalyst—

Examples of the addition reaction catalyst of the component (A4) include: a platinum black, platinic chloride, chloroplatinic acid, a reaction product of chloroplatinic acid and a monohydric alcohol, a complex of chloroplatinic acid and olefins, platinum-based catalysts such as platinum bisacetoacetate, and platinum-group metal catalysts such as a palladium-based catalyst and a rhodium-based catalyst. A blend amount of this addition reaction catalyst may be a catalytic amount, and is typically approximately 0.5 to 1,000 ppm, particularly approximately 1 to 500 ppm, as the platinum-group metal, relative to a total amount of the component (A1) and the component (A2) (a total amount of polymers having a siloxane bond).

The addition-crosslinkable silicone rubber composition of the component (A) is liquid at 25° C. The addition-crosslinkable silicone rubber composition has a viscosity at 25° C. of particularly preferably 10 to 3,000 Pas, further preferably 20 to 1,000 Pas. The viscosity is measured with a B-type (HAT-type) rotary viscosimeter by a method in accordance with JIS K 7117-1:1999.

—Component (B)—

As the component (B), expanded resin fine particles having an organic resin shell are blended. These fine particles (filler) provide a gas part in the cured rubber to reduce a specific gravity like a sponge rubber.

The organic resin shell of the expanded resin fine particles is not particularly limited, but preferably used is a material formed from a polymer of a monomer selected from the group consisting of vinylidene chloride, acrylonitrile, methacrylonitrile, an acrylate ester, and a methacrylate ester; or a copolymer of two or more of the monomer. The expanded resin fine particles used in the present invention are expanded resin fine particles formed by heat-expanding an unexpanded resin fine particles including a volatile substance or low boiling-point substance in this organic resin shell in a powder state alone in advance. When the expanded resin fine particles are blended, particles in which inorganic fillers such as calcium carbonate and talc adheres on its surface may be blended in order to strengthen the expanded resin fine particles, etc.

The above expanded resin fine particles have a true specific gravity of 0.01 to 0.3, preferably 0.01 to 0.25, to impart functions such as sufficient reduction in specific gravity and reduction in thermal conductivity in the silicone rubber sponge composition. If the true specific gravity is less than 0.01, blending and operation become difficult, and in addition, the expanded resin fine particles have insufficient pressure-resistant strength to be broken during blending or molding, which may lead to failure of weight reduction. If the specific gravity is more than 0.3, the specific gravity may not be sufficiently reduced.

An average particle diameter of the expanded resin fine particles is preferably 10 to 200 μm, and more preferably 50 to 150 μm. If this average particle diameter is more than 200 μm, the expanded resin fine particles may be broken due to pressure during molding to increase the specific gravity or deteriorate durability. In the present invention, the average particle diameter of the component (B) is referred to a value measured as a median diameter by using a particle size distribution measurement device with a laser-light diffraction method.

A blend amount of the expanded resin fine particles is 1.0 to 20 parts by mass, and preferably 1.5 to 18 parts by mass, relative to 100 parts by mass of the component (A). The expanded resin fine particles are preferably blended at 20 to 70%, a volume ratio to the component (A). When the blend amount is 20% or more, the reduction in the specific gravity, the reduction in the thermal conductivity, etc. become sufficient, and difficulty in one-cell foaming the sponge is eliminated. When the blend amount is 70% or less, difficulty in forming or blending is eliminated, and in addition, the molded material may not be brittle material without rubber elasticity.

—Component (C)—

In the present invention, in addition to the components (A) and (B), added as the component (C) are spherical particles having an average particle diameter being 0.001 to 0.5 times larger than the average particle diameter of the expanded resin fine particles of the component (B), and having an average circularity of 0.8 to 1. Adding the spherical particles allows the spherical particles of the component (C) to exhibit "roller effect" during flowing of the expanded resin fine particles of the component (B) dispersed in the crosslinkable silicone rubber composition of the component (A), resulting in improvement in the flowability of the inventive silicone composition.

The "roller effect" is an effect of fine particles (the inventive component (C)) serving as a lubricant or rollers between coarse particles (in the present invention, the expanded resin fine particles of the component (B)) to reduce a viscosity, in other words, improve flowability, of a composition system.

Examples of the spherical particles of the component (C) include: inorganic metal fine particles; inorganic oxide fine particles, such as silica and alumina; inorganic metal salts, such as nickel hydroxide and calcium carbonate; and organic resin fine particles, such as nylon powder, a polymethacrylate ester, and cellulose. Although the type and use are not limited, an object of the present invention is to improve the flowability of the silicone rubber sponge composition, and the raw material of the spherical particles of the component (C) is recommended to have a low (light) specific density and good heat resistance. In particular, a fused silica, a silicone resin, a glass, a hollow glass, alumina, or a mixture thereof is preferable.

A surface of these spherical particles of the component (C) may be subjected to a hydrophobization treatment with an organopolysiloxane, an organopolysilazane, chlorosilane, an alkoxysilane, etc. These spherical particles of the component (C) may be used alone, or may be used in combination of two or more thereof.

In an example of a method for producing the spherical particles, the fused silica is produced by thermally spraying method. The spherical silica particles can be obtained by supplying a crushed silica powder or silica gel into flame at a high temperature of 2000° C. or higher for melting the silica, and quenching the melted silica formed in spherical shape by the surface tension. The producing method also include a method in which a metal silicon powder is dispersed in an oxygen flow and ignited to oxidize the powder, the metal and the oxide are converted into vapor or liquid with its reaction heat, and cooled to obtain the spherical silica.

A method for producing the silicone resin particles is a method of obtaining the spherical silica fine particles substantially composed of a $SiO_{4/2}$ unit to a $R^3SiO_{3/2}$ unit by hydrolysis and condensation of a tetrafunctional silane compound, a partially hydrolyzed and condensed product of a trifunctional silane compound, or a combination thereof. In the chemical formula, $R^3$ represents a substituted or unsubstituted monovalent hydrocarbon group having 1 to 20 carbon atoms. In particular, silicone resin particles mainly produced from the trifunctional silane compound may be referred to as silsesquioxane particles. In the above, the silicone resin particles "substantially composed of a $SiO_{4/2}$ to a $R^3SiO_{3/2}$ unit" mean that, although the above fine particles are basically composed of a $SiO_{4/2}$ unit, the above fine particles are composed of not only the unit but the particles have many silanol groups on at least the surface, as commonly known, or have many hydrocarbon groups, such as methyl groups and vinyl groups. In some cases, it also means that a part of hydrolytic groups (hydrocarbyloxy groups) derived from the tetrafunctional silane compound, the trifunctional silane compound, and/or the partially hydrolyzed and condensed product thereof, which are the raw materials, is not converted into a silanol group, and a small amount thereof may remain on the fine particle surface or inside thereof as it is.

The fine particles produced by partially hydrolyzing the above silane compound have a feature of small variation of the particle diameter to obtain particles near the true sphere.

Known methods for producing glass particles and hollow glass particles include a spray pyrolysis method, a sol-gel method, and a hydrolysis method, and a spray pyrolysis method is commonly used. In this method, a material is sprayed into an electric furnace held at a predetermined temperature to be pyrolyzed using radiant heat from the electric heater. Since this method instantly pyrolyzes a raw material solution, submicron-order to micron-order fine particles that are multi-component and uniform raw material can be produced. Examples of a method for producing a hollow spherical glass include a method in which an impurity to generate gas, such as sulfur, and a sulfate salt, carbonate salt, and nitrate salt of an alkali-earth metal, is added into the above raw material for glass, and the raw material for glass is spouted at a pressure of 0.1 to 2 MPa to obtain the hollow glass.

A particle diameter of the spherical particles of the component (C) is an average particle diameter favorably 0.001 to 0.5 times, preferably 0.005 to 0.4 times, particularly preferably 0.01 to 0.3 times, larger than the average particle diameter of the expanded resin fine particles of the component (B). If this particle diameter is smaller than 0.001 time, the decrease phenomenon of the viscosity with the roller effect is not exhibited and the specific surface area of the powder increases to conversely increase the viscosity of the composition in some cases. If the particle diameter is larger than 0.5 times, the spherical particles of the component (C) have a size similar to the expanded resin fine particles of the component (B), and contact between the particles of the component (B) and the component (C) becomes large to deteriorate the good flowability with the roller effect and filling property into the composition, which is unpreferable.

The spherical particles of the component (C) are desirably particles with the true spherical shape, and preferably spherical particles having an average circularity of 0.8 to 1, more preferably 0.85 or more. If the average circularity is less than 0.8, that is irregular-shaped crushed particles, or particles with oval, fibric, or the like shape, having an aspherical surface are used, the smoothness of the component (B) with the roller effect is lost to exhibit no decrease phenomenon of the viscosity.

In the present invention, "spherical" includes not only the true sphere but also a slightly deformed sphere. Such a "spherical" shape is referred to a shape having a circularity, evaluated as a circularity when the particle is projected into two dimension, within a range of 0.8 to 1. The circularity herein is represented by (a circumference length of a circle having an area same as the particle)/(a circumference length of the particle). This circularity can be measured by image-analyzing a particle image obtained with an electron microscope, etc. An average particle size distribution of the spherical particles of the component (C) is measured with dynamic light scattering/laser doppler NANOTRAC particle size distribution measurement device (product name: UPA-EX150, manufactured by NIKKISO CO., LTD.), and the median diameter on a volumetric basis is specified as the particle diameter. The median diameter is a particle diameter equivalent to 50%-cumulation diameter when the particle size distribution is represented as a cumulation distribution.

A blend amount of the spherical particles of the component (C) is 0.1 to 10 parts by mass, preferably 0.2 to 7 parts by mass, and more preferably 0.3 to 5 parts by mass, relative to 100 parts by mass of the silicone rubber composition (A). If the blend amount is less than 0.1 part, the decrease in the viscosity, which is an indicator of improvement in the flowability, cannot be observed. If the blend amount is more than 10 parts by mass, a volume fraction of the component (C) relative to the component (A) increases to increase a hardness of the silicone rubber composition, and in addition, the viscosity is increased to increase density variation and hardness variation of the sponge rubber.

—Component (D)—

In the present invention, in addition to the components (A), (B), and (C), a polyhydric alcohol or a derivative thereof is added as the component (D) to allow the silicone rubber sponge composition to be one-cell foamed. The one-cell foaming represents a state where a communicated hole is present between adjacent sponge cells in the rubber cured material, and is referred to a state where the air can enter the sponge inside through the outer skin of the cured sponge.

A mechanism for one-cell foaming the sponge is as follows. A volatilization temperature of the polyhydric alcohols is set to be higher than a temperature of heating and curing the silicone rubber composition of the component (A), and the polyhydric alcohols component is volatilized and removed after the rubber curing to one-cell foaming the sponge. Examples of this polyhydric alcohol or a derivative thereof include a monomer having at least one, preferably one to five, remained alcoholic hydroxy groups, the monomer being selected from: polyhydric alcohol having at least two alcoholic hydroxy groups in one molecule and having 2 to 10, preferably 2 to 8, carbon atoms, and a partial ether compound, partial ester compound, partially silylated compound, and partially halogenated compound of the polyhydric alcohol; and a polymer of one or two or more of the monomer.

Examples of the above polyhydric alcohol or a derivative thereof include: glycols, such as glycerin, ethylene glycol, propylene glycol, 1,3-butylene glycol, 1,4-butylene glycol, diethylene glycol, dipropylene glycol, pentaerythritol, and 3,6-dioxa-1,8-octanediol; partial ether compounds, such as ethylene glycol monoethyl ether, ethylene glycol monophenyl ether, diethylene glycol monomethyl ether, and dipropylene glycol monoethyl ether; partial ester compounds, such as glycerol monoacetate, glycerol diacetate, and ethylene glycol monoacetate; partially silylated compounds, such as ethylene glycol mono(trimethylsilyl) ether and diethylene glycol mono(trimethylsilyl) ether; partially halogenated compounds, such as glycerin-$\alpha$-monochlorohydrin; and polyalkylene glycols, such as polyethylene glycol, polypropylene glycol, and polyethylene glycol-polypropylene glycol copolymer. Preferable examples thereof include glycerin, ethylene glycol, propylene glycol, pentaerythritol, glycerin-$\alpha$-monochlorohydrin, polyethylene glycol, and polypropylene glycol.

These (D) polyhydric alcohols or derivatives thereof may be used alone, or may be used in combination of two or more thereof. A blend amount of the component (D) is 0.5 to 20 parts by mass, and preferably 3 to 18 parts by mass, relative to 100 parts by mass of the component (A). When this blend amount is 0.5 parts by mass or more, the effect of the one-cell foaming is exhibited. Conversely, when the blend amount is 20 parts by mass or less, the physical properties of the rubber, such as a rubber strength, is not considerably adversely affected.

—Other Components—

With the inventive silicone rubber sponge composition, a semi-reinforcing or non-reinforcing filler other than the reinforcing silica of the above component (A3) can be blended in addition to the above components depending on the object of the present invention. This semi-reinforcing or non-reinforcing filler is preferably a spherical filler having a diameter as small as possible. For example, heat resistant additives, such as titanium oxide and red iron oxide, a flame retardant (including a platinum complex), an antioxidant, a process auxiliary, etc. can be blended. Furthermore, a conductive carbon, a fullerene and CNF, which have a nano-level particle diameter, etc. can be added to form a conductive sponge.

Into the inventive silicone rubber sponge composition, thermal conductivity can be further imparted as necessary. A sponge can be produced by adding powders as a thermally conductive substance such as crushed quartz, zinc oxide, alumina, aluminum oxide, aluminum hydroxide, a metal silicon powder, silicon carbide, and fibric carbon fiber, for example. These materials have been added into silicones. Dispersants, such as an alkoxysilane, diphenylsilane diol, a carbon-functional silane, and a low molecular-weight siloxane blocked at both terminals with silanols, may be added.

A method for producing the inventive silicone rubber sponge composition is not particularly limited. All the components may be mixed at once. Alternatively, the liquid organopolysiloxane (A1) and the reinforcing silica (A3) among the component (A) may be mixed with a planetary mixer, a kneader, a Banbury mixer, or the like, and then the other components may be added. In addition, the component (A1) and the component (A3) may be heat-treated (kneaded with heating) as necessary. Further specifically, the producing method includes a method in which the component (A1), the reinforcing silica of the component (A3), and other additives are kneaded and heat-treated, then the mixture is cooled, then the component (B) and the component (C) are added, and the organohydrogenpolysiloxane of the component (A2) and the platinum catalyst of the component (A4), the addition-reaction catalyst, are finally added. The component (C) may be finally added after adding and mixing the component (A2) and the component (A4). A temperature and time of the above heat treatment are not particularly limited, and the heat treatment may be performed at 100 to 250° C. for 30 minutes to 5 hours.

Hereinafter, the inventive method for molding the sponge of the silicone rubber sponge composition will be described.

The inventive molding method is a molding method including a step of filling a mold illustrated in FIG. 1 with the silicone rubber sponge composition with applying a pressure. Exhibited effects are decrease in a density of the sponge, the molded material, and formation of the sponge having small density variation and hardness variation. The molding method is not particularly limited as long as the method transfers the silicone sponge composition into the mold with applying a pressure. An example of the filing method (molding method) includes cast molding and injection molding. The silicone sponge composition is injected into the mold with a pressure of 0.01 MPa to 5 MPa to form the sponge.

When the pressure is 0.01 MPa or more, the mold can be filled with the composition with the thixotropy of the composition. When the pressure is 5 MPa or less, a risk of collapse or break of the expanded resin fine particles of the component (B) due to a high filling pressure to fail to form a sponge is eliminated.

In a crosslinking step, the mold is filled with the silicone rubber sponge composition, and the composition is desirably crosslinked under a condition so that the actual temperature of the mold is 80 to 250° C. for approximately several seconds to 180 minutes. As a heating source, a heating wire heater, a ceramic heater, a hot-air dryer, heated water, heated glass beads, etc. can be used, for example.

In the crosslinking step, the expanded resin fine particles of the component (B) desirably does not break or largely expand in volume at a crosslink starting temperature of the silicone rubber sponge composition. For a purpose of completely proceeding the crosslinking reaction or volatilizing an unnecessary low-boiling-point composition residue or low-molecular-weight silicone, separately from the temperature for curing the rubber composition, a secondary heating step, called as a post-cure, may be performed under a condition at 150 to 250° C. for approximately 10 to 400 minutes.

The one-cell foaming step in the present invention can one-cell foam the sponge rubber with the composition in which the component (D) is added. The one-cell foaming is typically achieved concurrently with the post-cure step. The purpose is to volatilize the component (D), and a heat treatment is desirably performed with a hot-air dryer at a temperature of 200 to 250° C. for approximately 0.5 to 20 hours.

The highly one-cell foamed silicone rubber sponge has a one-cell foaming rate of preferably 60% or more, more preferably 60 to 100%, further preferably 75 to 100%. In the present invention, the one-cell foaming rate is measured by the following method.

<Method for Measuring One-Cell Foaming Rate>

The method for measuring the one-cell foaming rate may be performed by, for example, the following method.

(1) A specific gravity and mass of a sponge sample are measured.

Note that the specific gravity is measured by a method in accordance with JIS K 6268:1998, and an immersion time in water during the specific gravity measurement is within 5 seconds.

(2) A sponge 10 is immersed in water 3 in a container 2 placed in a vacuum chamber 1, as illustrated in FIG. 3. In this state, a pressure in the vacuum chamber 1 is reduced to 10 mmHg or lower with a vacuum pump 4.

(3) The pressure in the vacuum chamber is returned to a normal pressure, and then the sponge is left to stand for 5 minutes to absorb water.

(4) A mass of the sponge in the water-absorbing state is measured. Then, the one-cell foaming rate is determined with the following calculation formula.

$$\text{one-cell foaming rate (\%)} = [(\text{mass of sponge sample after water absorption with reduced pressure} - \text{mass of initial sponge sample})/\text{specific gravity of water } (1.00)]/[(1 - (\text{specific gravity of sponge}/\text{specific gravity of rubber material without expanded resin fine particles}) \times (\text{mass of sponge sample}/\text{specific gravity of sponge})] \times 100$$

An expansion ratio of the sponge is preferably 110 to 1,000%, and particularly preferably 120 to 500%. The expansion ratio can be calculated with the formula (specific gravity of rubber material without expanded resin fine particles/specific gravity of sponge)×100 (%).

Such a silicone rubber sponge is useful for producing: a packing, cushioning material, and rubber plug composed of the sponge; and a roller used for an electrophotographic image forming member having at least one layer composed of the sponge, particularly a fixing member, a driving roller, a roller for feeding-discharging paper, etc. Examples of the fixing member include a fixing roller and a fixing-belt supporting roller that have a single layer composed of the one-cell foaming sponge, a multilayer fixing roller in which two or more layers composed of the sponge adhere to a surface-layer removing material having two or more layers, such as a PFA tube, and a fixing roller used for melt-fixing toner and having a multilayer-structured fixing roller structure composed of solid rubber, the sponge rubber layer, and a toner removing layer.

A roller member produced by using the inventive silicone rubber sponge composition has small density variation and hardness variation, particularly in the length direction of the roller. Thus, a roller member suitable for the electrophotographic image forming member can be produced.

EXAMPLE

Hereinafter, the present invention will be specifically described by using Examples and Comparative Examples, but the present invention is not limited thereto. Note that "parts" hereinafter is referred to "parts by mass".

Each component used in Examples and Comparative Examples is as follows.

<Organopolysiloxane Composition 1>

Mixing 100 parts of dimethylpolysiloxane blocked at both terminals with dimethylvinylsiloxy groups (A1) having a polymerization degree of 300, a viscosity at 25° C. of 3 Pa·s, and a vinyl amount of 0.67 mol %; 3 parts of fumed silica (AEROSIL 200, manufactured by NIPPON AEROSIL CO., LTD.) (A3) having a specific surface area of 200 m²/g; 2 parts of hexamethyldisilazane; 0.2 parts of divinyltetramethyldisilazane; and 1.0 part of water were blended at a room temperature for 30 minutes. Then, the mixture was heated to 150° C. for continuously stirred for 3 hours, and cooled to obtain a silicone rubber base. In addition, 1.4 parts of methylhydrogenpolysiloxane having SiH groups at both terminals and side chains (polymerization degree: 17, SiH amount: 0.006 mol/g) (A2) as a crosslinker; and 0.05 parts of ethynylcyclohexanol as a reaction inhibitor were added. The mixture was continuously stirred for 15 minutes to obtain a base rubber composition. Into this base rubber composition, 0.1 part of a platinum catalyst (Pt concentration: 1 mass %) (A4) was blended to prepare "organopolysiloxane composition 1".

In the above "organopolysiloxane composition 1", the organopolysiloxane of the component (A) is composed of the components (A1), (A2), (A3), and (A4) in each component.

—Expanded Resin Fine Particles (B)—

(B1): Product name 920DE80d30 (manufactured by Japan Fillite Co., Ltd., average particle diameter: 80 μm, true specific gravity: 0.030)

(B2): Product name: F80DE (manufactured by Matsumoto Yushi-Seiyaku Co., Ltd., average particle diameter: 110 μm, true specific gravity: 0.020)

(B3): Product name MFL-HD60CA (manufactured by Matsumoto Yushi-Seiyaku Co., Ltd., average particle diameter: 60 μm, true specific gravity: 0.120, the product has an acrylonitrile shell surface covered with calcium carbonate)

—Spherical Particles (C)—

(C1): Fused silica: product name FB-3SDC (manufactured by Denka Company Limited, average particle diameter: 3 μm, circularity: 0.86)

(C2): Silicone resin: product name KMP-590 (manufactured by Shin-Etsu Chemical Co., Ltd., average particle diameter: 2 μm, circularity: 0.96)

(C3): Hollow glass: product name CellSpheres (manufactured by TAIHEIYO CEMENT CORPORATION, average particle diameter: 4 μm, circularity: 0.88)

(C4): Fused silica: product name FB-3SDC (manufactured by Denka Company Limited, average particle diameter: 41 μm, circularity: 0.82)

(C5): Alumina: product name DAM-03 (manufactured by Denka Company Limited, average particle diameter: 3.7 μm, circularity: 0.92)

(C6): Silicone resin: product name X-52-854 (manufactured by Shin-Etsu Chemical Co., Ltd., average particle diameter: 0.7 μm, circularity: 0.96)

(C7): Diatomaceous earth: product name Oplite 3005K (manufactured by Chuo Kasei Co., Ltd., average particle diameter: 3.5 μm, circularity: 0.72)

(C8): Sol-gel silica: product name QSG-100 (manufactured by Shin-Etsu Chemical Co., Ltd., average particle diameter: 0.7 μm, circularity: 0.98)

A sponge composition of each Example and each Comparative Example and a method for evaluating a sponge molded material are described below.

—Method for Measuring Viscosity after Shearing of Composition Before Crosslinking—

Measurement device: model name MARS40, manufactured by HAAKE; Model number of used corn plate: C20 2°/Ti (diameter: 20 mm, angle: 2°); Gap distance: 0.109 mm; Measurement temperature: 23° C. A sample was sandwiched with the corn plate, a waiting time of 30 seconds was given, and then the following shearing was applied to measure a viscosity at a shearing viscosity 10 (1/s).

Initial: 0.0001 (1/s); 300 seconds later: 20 (1/s); linear acceleration in Log scale; Number of obtained data: 600.

—Sponge Hardness and Hardness Variation—

A sponge hardness is measured with Asker C hardness in accordance with JIS S 6050:2008. As illustrated in FIG. 2, Asker C hardness was measured at six points with interval of 20 mm from the casting port side of a cast-molded material with 6 mm in thickness to determine a maximum value, a minimum value, and an average value. The average value of the six-point results was specified as the sponge hardness. A quotient of the maximum value and the minimum value was specified as a variation index to calculate a standard deviation of the variation σ of the six-point hardness. A material having a smaller standard deviation σ exhibits a smaller hardness variation due to molding.

—Measurement of Sponge Density—

A sponge density is evaluated by vulcanized rubber-density measurement in accordance with JIS K 6249:2003. Of a cast-molded material with 6 mm in thickness, a part with 20 mm from the casting port side and a part with 20 mm inward from the overflow side were cut into a 1-cm square to measure sponge densities. The results were specified as "sponge on the casting side" and "sponge on the outlet side", respectively.

<Method for Measuring One-Cell Foaming Rate>

(1) A specific gravity and mass of a sponge sample are measured.

Note that the specific gravity is measured by a method in accordance with JIS K 6268:1998, and an immersion time in water during the specific gravity measurement is within 5 seconds.

(2) A sponge 10 is immersed in water 3 in a container 2 placed in a vacuum chamber 1, as illustrated in FIG. 3. In this state, A pressure in the vacuum chamber 1 is reduced to 10 mmHg or lower with a vacuum pump 4.

(3) The pressure in the vacuum chamber is returned to a normal pressure, and then the sponge is left to stand for 5 minutes to absorb water.

(4) A mass of the sponge in the water-absorbing state is measured. Then, the one-cell foaming rate is determined with the following calculation formula.

$$\text{one-cell foaming rate (\%)} = [(\text{mass of sponge sample after water absorption with reduced pressure} - \text{mass of initial sponge sample})/\text{specific gravity of water }(1.00)]/[(1 - (\text{specific gravity of sponge}/\text{specific gravity of rubber material without expanded resin fine particles})) \times (\text{mass of sponge sample}/\text{specific gravity of sponge})] \times 100$$

Examples 1 to 10

Example 1

Into a planetary mixer, 100 parts of the "organopolysiloxane composition 1", 3.8 parts of the expanded resin particles (B1, true specific gravity: 0.030, average particle diameter: 80 μm), and 3.0 parts of the spherical fused silica particles (C1, average particle diameter: 3.0 μm, average circularity: 0.86) were added. The mixture was stirred for 20 minutes, and then mix-defoamed at a reduced pressure of a degree of vacuum of −0.1 MPa for 5 minutes to obtain a silicone rubber composition. This silicone rubber composition was casted into a plate casting mold (made of SUS420) through a casting port with a pressure of 0.5 MPa. The mold has: an inner space having a lateral length of 45 mm, a longitudinal length of 140 mm, and a thickness of 6 mm; the casting port and an overflow port with 3 mmΦ in diameter provided at centers of both ends on the 35-mm lateral sides; and a thickness of 5 mm. Immediately after overflow of the composition through the port with 3 mm on the opposite side was observed, the mold was laterally place in a hot air dryer at 150° C. to crosslink the rubber for 60 minutes. Then, the rubber was taken out of the mold to obtain a plate silicone molded material.

Thereafter, this plate molded material having a thickness of 6 mm was heated with a hot air dryer at 220° C. for heating with hot air at a normal pressure for 4 hours to obtain a silicone sponge. A hardness, density, and one-cell foaming rate of the obtained sponge were measured as above. Table 1 shows the evaluation results.

Example 2

A sponge was produced to obtain its properties in the same manner as in Example 1 except that 6.0 parts of triethylene glycol (manufactured by Wako Chemical Co., Ltd., 1st grade, purity of 95% or more) was added as the component (D) into the composition described in Example 1. Table 1 shows the evaluation results of the sponge.

Example 3

A sponge was produced to obtain its properties in the same manner as in Example 1 except that 3.0 parts of the spherical fused silica particles (C1) in the composition described in Example 1 was changed to 0.5 parts thereof. Table 1 shows the evaluation results of the sponge.

Example 4

A sponge was produced to obtain its properties in the same manner as in Example 1 except that 3.0 parts of the spherical fused silica particles (C1) in the composition described in Example 1 was changed to 1.0 part of spherical silicone resin particles (C2, average particle diameter: 2.0 μm, average circularity: 0.96). Table 1 shows the evaluation results of the sponge.

Example 5

A sponge was produced to obtain its properties in the same manner as in Example 1 except that 3.0 parts of the spherical fused silica particles (C1) in the composition described in Example 1 was changed to 0.5 parts of spherical hollow glass particles (C3, average particle diameter: 4.0 μm, average circularity: 0.88). Table 1 shows the evaluation results of the sponge.

Example 6

A sponge was produced to obtain its properties in the same manner as in Example 1 except that 3.0 parts of the spherical fused silica particles (C1) in the composition described in Example 1 was changed to 2.0 parts of spherical fused silica particles with a large particle diameter (C4, average particle diameter: 41 μm, average circularity: 0.82). Table 1 shows the evaluation results of the sponge.

Example 7

A sponge was produced to obtain its properties in the same manner as in Example 1 except that 3.8 parts of the expanded resin particles (B1) in the composition described in Example 1 was reduced to 1.2 parts thereof. Table 1 shows the evaluation results of the sponge.

Example 8

A sponge was produced to obtain its properties in the same manner as in Example 1 except that, into 100 parts of the "organopolysiloxane composition 1", 2.7 parts of the expanded resin particles (B2, true specific gravity: 0.020, particle diameter: 110 μm), 10 parts of the spherical alumina particles (C5, average particle diameter: 3.7 μm, average circularity: 0.92), and 6.0 parts of triethylene glycol as the component (D) were added. Table 1 shows the evaluation results of the sponge.

Example 9

A sponge was produced to obtain its properties in the same manner as in Example 1 except that, into 100 parts of the "organopolysiloxane composition 1", 2.7 parts of the expanded resin particles (B2), 2.0 parts of the spherical silicone resin particles (C6, average particle diameter: 0.7 μm, average circularity: 0.96), and 6.0 parts of triethylene glycol as the component (D) were added. Table 1 shows the evaluation results of the sponge.

Example 10

A sponge was produced to obtain its properties in the same manner as in Example 1 except that, into 100 parts of the "organopolysiloxane composition 1", 18 parts of the expanded resin particles having an acrylonitrile shell surface covered with calcium carbonate (B3, average particle diameter: 60 μm, true specific gravity: 0.120), 1.0 part of the spherical silicone resin particles (C2), and 9.0 parts of triethylene glycol as the component (D) were added. Table 1 shows the evaluation results of the sponge.

Comparative Examples 1 to 6

Comparative Example 1

Into a planetary mixer, 100 parts of the "organopolysiloxane composition 1" and 3.8 parts of the expanded resin particles (B1, true specific gravity: 0.030, average particle diameter: 80 μm) were added. The mixture was stirred for 30 minutes to obtain a silicone rubber composition. This silicone rubber composition was casted into a plate casting mold through a casting port with a pressure of 0.5 MPa, which was same as in Example 1. The mold has: an inner space having a lateral length of 45 mm, a longitudinal length of 140 mm, and a thickness of 6 mm; the casting port and an overflow port with 3 mmΦ in diameter provided at centers of both ends on the 35-mm lateral sides; and a thickness of 5 mm. Immediately after overflow of the composition through the port with 3 mm on the opposite side was observed, the mold was laterally place in a hot air dryer at 150° C. to crosslink the rubber for 60 minutes. Then, the rubber was taken out of the mold to obtain a plate silicone molded material. Thereafter, this plate molded material having a thickness of 6 mm was heated with a hot air dryer at 220° C. for heating with hot air at a normal pressure for 4 hours to obtain a silicone sponge. A hardness, density, and one-cell foaming rate of the obtained 6-mm plate sponge were measured in the same manner as in Example 1. Table 2 shows the evaluation results.

Comparative Example 2

A sponge was produced to obtain its properties in the same manner as in Comparative Example 1 except that 12 parts of the spherical fused silica particles (C1, average particle diameter: 3.0 μm, average circularity: 0.86) was added into the composition described in Comparative Example 1. Table 2 shows the evaluation results of the sponge.

Comparative Example 3

A sponge was produced to obtain its properties in the same manner as in Comparative Example 1 except that: 12 parts of the spherical fused silica particles (C1) in the composition described in Comparative Example 2 was changed to 3.0 parts of the amorphous diatomaceous earth particles (C7, average particle diameter: 3.5 μm, average circularity: 0.72); and 6.0 parts of triethylene glycol as the component (D) were added. Table 2 shows the evaluation results of the sponge.

Comparative Example 4

A sponge was produced to obtain its properties in the same manner as in Comparative Example 1 by producing a composition in which, into 100 parts of the "organopolysiloxane composition 1", 2.7 parts of the expanded resin particles (B2, true specific gravity: 0.020, particle diameter: 110 μm), 1.0 part of the spherical sol-gel silica with a small particle diameter (C8, average particle diameter: 0.7 μm, average circularity: 0.98), and 6.0 parts of triethylene glycol as the component (D) were added. Table 2 shows the evaluation results of the sponge.

Comparative Example 5

A sponge was produced to obtain its properties in the same manner as in Comparative Example 1 by producing a composition in which, into 100 parts of the "organopolysiloxane composition 1", 18 parts of the expanded resin particles (B3, average particle diameter: 60 μm, true specific gravity: 0.120), 2.0 parts of the fused silica with a large particle diameter (C4, average particle diameter: 41 μm, average circularity: 0.82), and 9.0 parts of triethylene glycol as the component (D) were added. Table 2 shows the evaluation results of the sponge.

Comparative Example 6

A sponge was produced to obtain its properties in the same manner as in Comparative Example 1 by producing a composition in which, into 100 parts of the "organopolysiloxane composition 1", 25 parts of the expanded resin particles (B3, average particle diameter: 60 μm, true specific gravity: 0.120), 1.0 part of the spherical silicone resin particles (C2, average particle diameter: 2.0 μm, average circularity: 0.96), and 9.0 parts of triethylene glycol as the component (D) were added. Table 2 shows the evaluation results of the sponge.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Organopolysiloxane composition 1 | 100 | ← | ← | ← | ← | ← | ← | ← | ← | ← |
| Expanded resin fine particles | B1 | B1 | B1 | B1 | B1 | B1 | B1 | B2 | B2 | B3 |
| Particle diameter of expanded resin μm | 80 | 80 | 80 | 80 | 80 | 80 | 80 | 110 | 110 | 60 |
| Addition amount of expanded resin fine particles | 3.8 | 3.8 | 3.8 | 3.8 | 3.8 | 3.8 | 1.2 | 2.7 | 2.7 | 18 |
| Spherical particles | C1 fused | C1 fused | C1 fused | C2 resin | C3 hollow glass | C4 fused large | C1 fused | C5 alumina | C6 resin small | C2 resin |
| Average circularity | 0.86 | 0.86 | 0.86 | 0.96 | 0.88 | 0.82 | 0.86 | 0.92 | 0.96 | 0.96 |
| Particle diameter of spherical particles μm | 3.0 | 3.0 | 3.0 | 2.0 | 4.0 | 41.0 | 3.0 | 3.7 | 0.7 | 2.0 |
| Addition amount of spherical particles | 3 | 3 | 0.5 | 1 | 0.5 | 2 | 3 | 10 | 2 | 1 |
| Ratio of particle diameter (C)/(B) | 0.038 | 0.038 | 0.038 | 0.025 | 0.050 | 0.370 | 0.038 | 0.034 | 0.007 | 0.033 |
| TEG amount | 0 | 6 | 0 | 0 | 0 | 0 | 0 | 6 | 6 | 9 |
| Shear viscosity Pa · s | 75 | 94 | 78 | 68 | 74 | 78 | 58 | 92 | 80 | 110 |
| Average hardness (Asker C) | 44.3 | 24.2 | 44.5 | 43.8 | 43.3 | 45.2 | 52.2 | 27.7 | 24.0 | 17.8 |
| Maximum hardness | 44 | 25 | 44 | 44 | 45 | 46 | 53 | 29 | 24 | 29 |
| Minimum hardness | 45 | 24 | 45 | 43 | 44 | 44 | 52 | 27 | 23 | 27 |
| Variation index of hardness | 1.02 | 1.04 | 1.02 | 1.02 | 1.02 | 1.05 | 1.04 | 1.07 | 1.04 | 1.07 |
| Standard deviation of hardness | 0.47 | 0.37 | 0.50 | 0.37 | 0.47 | 0.69 | 0.37 | 0.74 | 0.37 | 0.81 |
| Sponge density on injection side | 0.51 | 0.49 | 0.50 | 0.51 | 0.48 | 0.51 | 0.72 | 0.53 | 0.49 | 0.55 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Sponge density on outlet side | 0.51 | 0.49 | 0.51 | 0.51 | 0.48 | 0.52 | 0.73 | 0.55 | 0.49 | 0.56 |
| Sponge one-cell foaming rate (%) Note | 8 | 98 | 7 | 7 | 9 | 6 | 4 | 96 | 98 | 84 |

TABLE 2

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Organopolysiloxane composition 1 | 100 | ← | ← | ← | ← | ← |
| Expanded resin fine particles | B1 | B1 | B1 | B2 | B3 | B3 |
| Particle diameter of expanded resin μm | 80 | 80 | 80 | 110 | 60 | 60 |
| Addition amount of expanded resin fine particles | 3.8 | 3.8 | 3.8 | 2.7 | 18 | 25 |
| Spherical particles | None | C1 fused | C7 diatomaceous earth | C8 sol-gel | C4 fused large | C2 resin |
| Average circularity |  | 0.86 | 0.72 | 0.98 | 0.82 | 0.96 |
| Particle diameter of spherical particles μm |  | 3.0 | 3.5 | 0.7 | 41.0 | 2.0 |
| Addition amount of spherical particles |  | 12 | 3 | 1 | 2 | 1 |
| Ratio of particle diameter (C)/(B) |  | 0.038 | 0.044 | 0.0006 | 0.680 | 0.033 |
| TEG amount | 0 | 0 | 6 | 6 | 9 | 9 |
| Shear viscosity Pa · s | 130 | 160 | 125 | 140 | 130 | 230 |
| Average hardness (Asker C) | 44.2 | 51.5 | 25.5 | 23.8 | 29.3 | 21.8 |
| Maximum hardness | 52 | 56 | 29 | 26 | 32 | 28 |
| Minimum hardness | 39 | 50 | 24 | 23 | 28 | 19 |
| Variation index of hardness | 1.33 | 1.12 | 1.21 | 1.13 | 1.14 | 1.47 |
| Standard deviation of hardness | 4.56 | 3.14 | 1.89 | 1.21 | 1.34 | 3.33 |
| Sponge density on injection side | 0.52 | 0.56 | 0.51 | 0.49 | 0.55 | 0.35 |
| Sponge density on outlet side | 0.56 | 0.59 | 0.55 | 0.53 | 0.58 | 0.41 |
| Sponge one-cell foaming rate (%) Note | 9 | 7 | 90 | 98 | 81 | 74 |

As understood from each Example and each Comparative Example in Tables 1 and 2, it is found that the sponge compositions of the present Examples (the inventive products) can yield the sponge molded material having the reduced hardness variation and density variation with adding the spherical particles of the component (C) to reduce the viscosity.

Examples 11 to 13

Example 11

Into a planetary mixer, 100 parts of the "organopolysiloxane composition 1", 3.8 parts of the expanded resin particles (B1, true specific gravity: 0.030, average particle diameter: 80 μm) and 3.0 parts of the spherical fused silica particles (C1, average particle diameter: 3.0 μm, average circularity: 0.86) were added. The mixture was stirred for 20 minutes, and then mix-defoamed at a reduced pressure of a degree of vacuum of –0.1 MPa for 5 minutes to obtain a silicone rubber composition. This silicone rubber composition was casted into a plate casting mold (made of SUS420) through a casting port with a pressure of 0.03 MPa. The mold has: an inner space having a lateral length of 45 mm, a longitudinal length of 140 mm, and a thickness of 6 mm; the casting port and an overflow port with 3 mmΦ in diameter provided at centers of both ends on the 35-mm lateral sides; and a thickness of 5 mm. Immediately after overflow of the composition through the port with 3 mm on the opposite side was observed, the mold was laterally place in a hot air dryer at 150° C. to crosslink the rubber for 60 minutes. Then, the rubber was taken out of the mold to obtain a plate silicone molded material.

Thereafter, this plate molded material having a thickness of 6 mm was heated with a hot air dryer at 220° C. for heating with hot air at a normal pressure for 4 hours to obtain a silicone sponge. A hardness, density, and one-cell foaming rate of the obtained sponge were measured in the same manner as in Example 1. Table 3 shows the evaluation results.

Example 12

A sponge was produced to obtain its properties in the same manner as in Example 11 except that the casting pressure of the composition of Example 11, 0.03 MPa, was changed to 0.5 MPa. Table 3 shows the evaluation results of the sponge.

Example 12 had the same composition and molding condition as in Example 1.

Example 13

A sponge was produced to obtain its properties in the same manner as in Example 11 except that the casting pressure of the composition of Example 11, 0.03 MPa, was changed to 5 MPa. Table 3 shows the evaluation results of the sponge.

Comparative Examples 7 to 10

Comparative Example 7

Into a planetary mixer, 100 parts of the "organopolysiloxane composition 1" and 3.8 parts of the expanded resin particles (B1, true specific gravity: 0.030, average particle diameter: 80 μm) were added. The mixture was stirred for 30 minutes to obtain a silicone rubber composition. This silicone rubber composition was casted into a plate casting mold through a casting port with a pressure of 0.03 MPa, which was same as in Example 1. The mold has: an inner space having a lateral length of 45 mm, a longitudinal length of 140 mm, and a thickness of 6 mm; the casting port and an overflow port with 3 mmΦ in diameter provided at centers of both ends on the 35-mm lateral sides; and a thickness of 5 mm. However, overflow of the composition through the port with 3 mm on the opposite side was not observed even after 3 minutes, which was insufficient filling state. Although no overflow was observed, the mold was laterally place immediately in a hot air dryer at 150° C. to crosslink the rubber for 60 minutes. Then, the rubber was taken out of the mold to obtain a plate silicone molded material. Thereafter, this plate molded material having a thickness of 6 mm was heated with a hot air dryer at 220° C. for heating with hot air at a normal pressure for 4 hours to obtain a silicone sponge. A hardness, density, and one-cell foaming rate of the obtained 6-mm plate sponge were measured in the same manner as in Example 11. Table 3 shows the evaluation results.

Comparative Example 8

A sponge was produced to obtain its properties in the same manner as in Comparative Example 7 except that the casting pressure of the composition of Comparative Example 7, 0.03 MPa, was changed to 0.5 MPa. With the casting pressure of 0.5 MPa, the material discharge through the overflow port was observed. A hardness, density, and one-cell foaming rate of the sponge were measured as above. Table 3 shows the evaluation results of the sponge.

Comparative Example 8 had the same composition and molding condition as in Comparative Example 1.

Comparative Example 9

A sponge was produced to obtain its properties in the same manner as in Comparative Example 7 except that the casting pressure of the composition of Comparative Example 7, 0.03 MPa, was changed to 5 MPa. With the casting pressure of 5 MPa, the material discharge through the overflow port was observed. A hardness, density, and one-cell foaming rate of the sponge were measured as above. Table 3 shows the evaluation results of the sponge.

Comparative Example 10

A sponge was produced to obtain its properties in the same manner as in Comparative Example 7 except that the casting pressure of the composition of Comparative Example 7, 0.03 MPa, was changed to 8 MPa. Almost all the sponge cells were crosslinked with collapsed due to the high casting pressure, and which was a state of almost no space of sponge cell. A hardness, density, and one-cell foaming rate of the sponge were measured as above. Table 3 shows the evaluation results of the sponge.

TABLE 3

|  | Ex. 11 | Ex. 12 | Ex. 13 | Comp. Ex. 7 | Comp. Ex. 8 | Comp. Ex. 9 | Comp. Ex. 10 |
|---|---|---|---|---|---|---|---|
| Organopolysiloxane composition 1 | 100 | ← | ← | ← | ← | ← | ← |
| Expanded resin fine particles | B1 | B1 | B1 | B1 | B1 | B1 | B1 |
| Particle diameter of expanded resin μm | 80 | 80 | 80 | 80 | 80 | 80 | 80 |
| Addition amount of expanded resin fine particles | 3.8 | 3.8 | 3.8 | 3.8 | 3.8 | 3.8 | 3.8 |
| Spherical particles | C1 fused | C1 fused | C1 fused | None | None | None | None |
| Average circularity | 0.86 | 0.86 | 0.86 |  |  |  |  |
| Particle diameter of spherical particles μm | 3.0 | 3.0 | 3.0 |  |  |  |  |
| Addition amount of spherical particles | 3 | 3 | 3 |  |  |  |  |
| Ratio of particle diameter (C)/(B) | 0.038 | 0.038 | 0.038 |  |  |  |  |
| TEG amount | 0 | 0 | 0 | 0 | 0 | 0 | 0 |
| Shear viscosity Pa · s | 75 | 75 | 75 | 130 | 130 | 130 | 130 |
| Injection pressure MPa | 0.03 | 0.5 | 5 | 0.03 | 0.5 | 5 | 8 |
| Average hardness (Asker C) | 43.3 | 44.3 | 58.3 | 43.5 | 44.2 | 59.0 | 64.3 |

TABLE 3-continued

| | Ex. 11 | Ex. 12 | Ex. 13 | Comp. Ex. 7 | Comp. Ex. 8 | Comp. Ex. 9 | Comp. Ex. 10 |
|---|---|---|---|---|---|---|---|
| Maximum hardness | 44 | 44 | 44 | 48 | 52 | 61 | 68 |
| Minimum hardness | 43 | 45 | 45 | 37 | 39 | 57 | 61 |
| Variation index of hardness | 1.02 | 1.02 | 1.04 | 1.30 | 1.33 | 1.07 | 1.11 |
| Standard deviation of hardness | 0.47 | 0.47 | 0.75 | 4.11 | 4.56 | 1.41 | 2.62 |
| Sponge density on injection side | 0.51 | 0.51 | 0.83 | 0.50 | 0.52 | 0.85 | 0.93 |
| Sponge density on outlet side | 0.50 | 0.51 | 0.84 | 0.43 | 0.56 | 0.89 | 0.91 |
| Sponge one-cell foaming rate (%) | 8 | 8 | 7 | 8 | 9 | 5 | 6 |
| Note | | | | insufficient filling | | | cell collapsed |

As understood from each Example and each Comparative Example in Table 3, it is found that the sponge compositions of the present Examples (the inventive products) have the good casting property even with a low casting pressure, and are silicone rubber sponge compositions that can yield the silicone rubber sponge having the reduced hardness variation and density variation. Meanwhile, blending no component (C), as in Comparative Examples 7 to 10, yielded the silicone rubber sponge having a large density, and large density variation and hardness variation.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A silicone rubber sponge composition, comprising:
(A) 100 parts by mass of an addition-crosslinkable silicone rubber composition containing a reinforcing silica and being liquid at 25° C.;
(B) 1.0 to 20 parts by mass of expanded resin fine particles having a specific gravity of 0.01 to 0.3, having an average particle diameter of 10 to 200 μm, and having an organic resin shell; and
(C) 0.1 to 10 parts by mass of spherical particles having an average particle diameter being 0.007 to 0.5 times larger than the average particle diameter of the expanded resin fine particles of the component (B), and having an average circularity of 0.8 to 1,
wherein the spherical particles of the component (C) are a silicone resin, a glass, a hollow glass, or a mixture thereof.

2. The silicone rubber sponge composition according to claim 1, further comprising (D) 0.5 to 20 parts by mass of one or two or more one-cell foaming agents selected from:

a monomer selected from a polyhydric alcohol having at least two alcoholic hydroxy groups in one molecule and having 2 to 10 carbon atoms, and a partial ether compound, partial ester compound, partially silylated compound, and partially halogenated compound of the polyhydric alcohol; and a polymer of one or two or more of the monomer.

3. The silicone rubber sponge composition according to claim 1, wherein the organic resin shell of the expanded resin fine particles of the component (B) is: a polymer of a monomer selected from the group consisting of vinylidene chloride, acrylonitrile, methacrylonitrile, an acrylate ester, and a methacrylate ester; or a copolymer of two or more of the monomer.

4. The silicone rubber sponge composition according to claim 2, wherein the organic resin shell of the expanded resin fine particles of the component (B) is: a polymer of a monomer selected from the group consisting of vinylidene chloride, acrylonitrile, methacrylonitrile, an acrylate ester, and a methacrylate ester; or a copolymer of two or more of the monomer.

5. A method for producing a silicone rubber sponge, the method comprising a step of forming a sponge by injecting the silicone rubber sponge composition according to claim 1 into a mold at a pressure of 0.01 MPa to 5 MPa.

6. A method for producing a silicone rubber sponge, the method comprising a step of forming a sponge by injecting the silicone rubber sponge composition according to claim 2 into a mold at a pressure of 0.01 MPa to 5 MPa.

7. A method for producing a silicone rubber sponge, the method comprising a step of forming a sponge by injecting the silicone rubber sponge composition according to claim 3 into a mold at a pressure of 0.01 MPa to 5 MPa.

8. A method for producing a silicone rubber sponge, the method comprising a step of forming a sponge by injecting the silicone rubber sponge composition according to claim 4 into a mold at a pressure of 0.01 MPa to 5 MPa.

* * * * *